Sept. 7, 1954    J. MORKOSKI ET AL    2,688,225
COTTON PICKER DOFFER

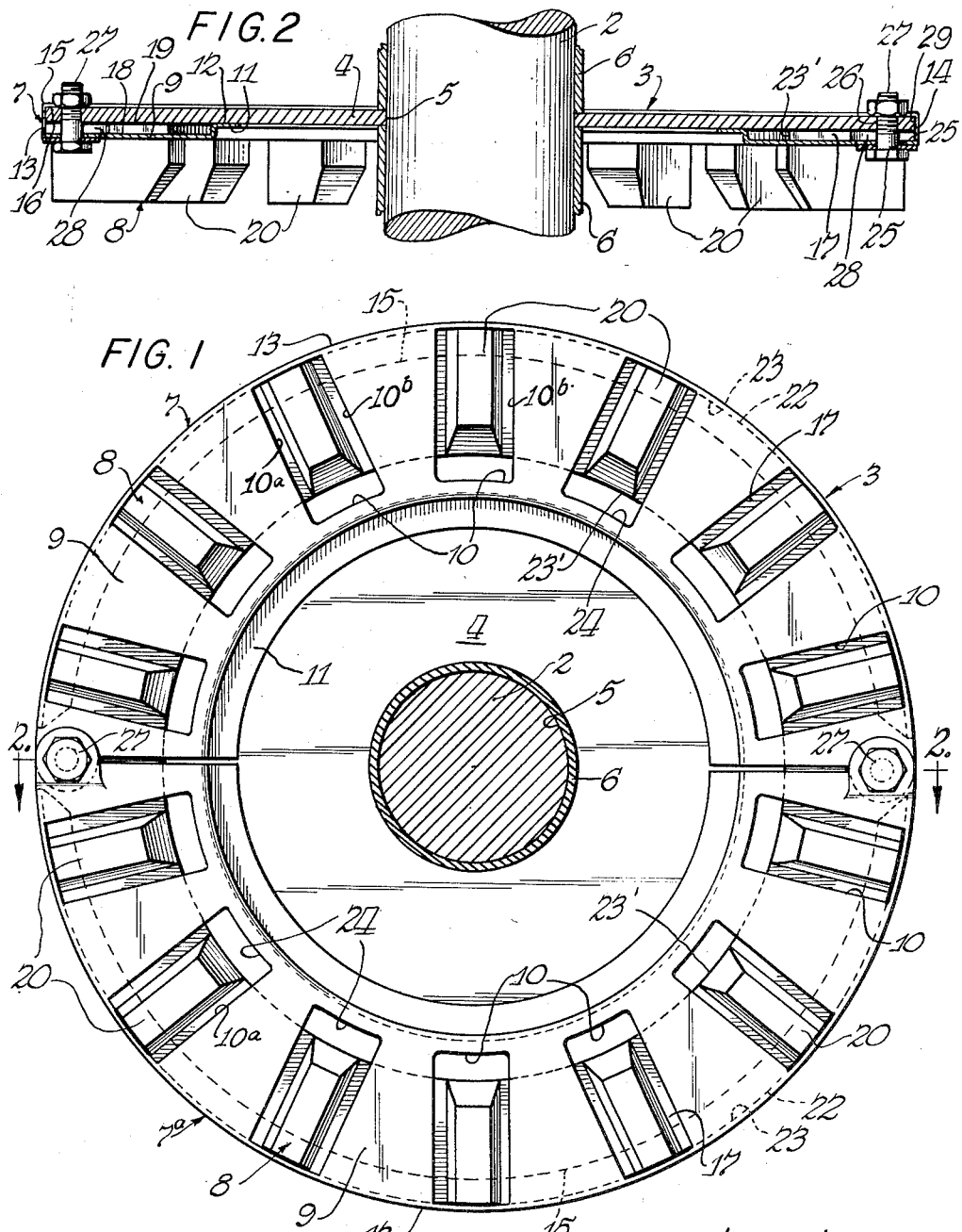

Filed March 2, 1953    2 Sheets-Sheet 2

Inventors
James Morkoski
Delos A. Walker

Paul O. Pippel
Atty.

Patented Sept. 7, 1954

2,688,225

UNITED STATES PATENT OFFICE 2,688,225

COTTON PICKER DOFFER

James Morkoski and Delos A. Walker, Memphis, Tenn., assignors to International Harvester Company, a corporation of New Jersey Application March 2, 1953, Serial No. 339,864

6 Claims. (Cl. 56—44)

This invention relates to doffing mechanism for cotton pickers and more specifically to novel doffing elements of the type mounted on a rotating carrier for removing cotton from picking elements such as rotating spindles.

The most practical cotton picker in use features a picking unit which comprises a drum rotatable about a vertical axis and provided with a plurality of picking spindles individually rotatable on substantially horizontal axes and disposed in vertically spaced series. As the machine is moved along a row of cotton plants, the spindles move into the plants and operate to pick the cotton by wrapping it on the spindles which are moved in an orbit out of the plants toward doffing mechanism which removes the cotton from the spindles for subsequent delivery of the cotton to a suitable receptacle. One particular doffing mechanism heretofore in use is that type which comprises a vertical shaft on which is secured a plurality of doffing members, one for each series of spindles. These doffing members are interleaved with the spindles and rotate in such directions that they engage the cotton on the spindles by doffing elements, which principally are constituted of rubber lugs.

The selection of rubber in the making of these doffer lugs had been carefully made on the basis of performance and with the knowledge that such wearable lugs would have to be replaced. Various constructions feature arrangements wherein the blocks are formed integral with a disk which is mounted on the carrier or provide small block segments which are removably fixed to the disk.

A principal object of the invention is to provide a novel doffer assembly wherein the doffer lug portions are easily secured and removed from the carrier disk while the disk is in assembled relationship with the carrier shaft.

A more specific object of the invention is to devise an economical highly efficient and novel securement of the doffer elements to the carrier disk such as will hold these doffer elements positively secured to the carrier plate and wherein the parts are easily assembled and dismantled and wherein the number of different parts is reduced to the minimum.

The foregoing and other important objects and desirable features inherent and encompassed by the invention will become apparent as a complete disclosure of a preferred form of the invention is made in the following detailed description and accompanying sheets of drawings in which:

Figure 1 is a bottom plan view of the novel doffer assembly with parts broken away and shown in section;

Figure 2 is a transverse sectional view taken substantially on the line 2—2, Figure 1, and showing the doffer mounted in association with the carrier shaft;

Figure 3:
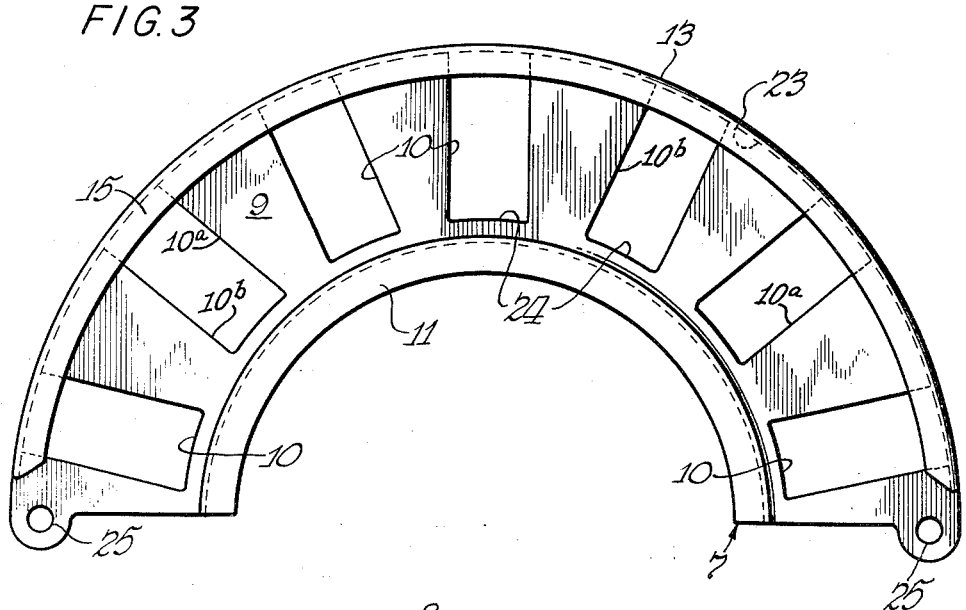
Figure 3 is a top plan view of one of the securing members.

A general understanding of the operation of a cotton picker of the doffed spindle type may be had from U. S. Patent to Johnston 2,140,631. The doffing mechanism herein illustrated comprises a vertical shaft 2, which may be rotated by any suitable source of power and which carries a plurality of vertically spaced, circular doffers or carriers (only one of which is shown), generally designated 3, spaced apart in accordance with the vertical spacing of the associated spindles.

Each doffer comprises a circular plate carrier member or hub 4, which has a central bore or opening 5, to receive the doffer shaft 2. The plate-like mounting member is constrained for rotation with the shaft by any suitable means such as a key or clamping spacers 6 made in a general arrangement as shown in a copending application filed in the name of L. P. Millard, Serial No. 211,463 for Cotton Picker Doffer Assembly on February 17, 1951, now U. S. Patent 2,654,202. The axis of the carrier is, of course, the axis of the shaft 2 and the general plane of the carrier is horizontal.

Figure 4:
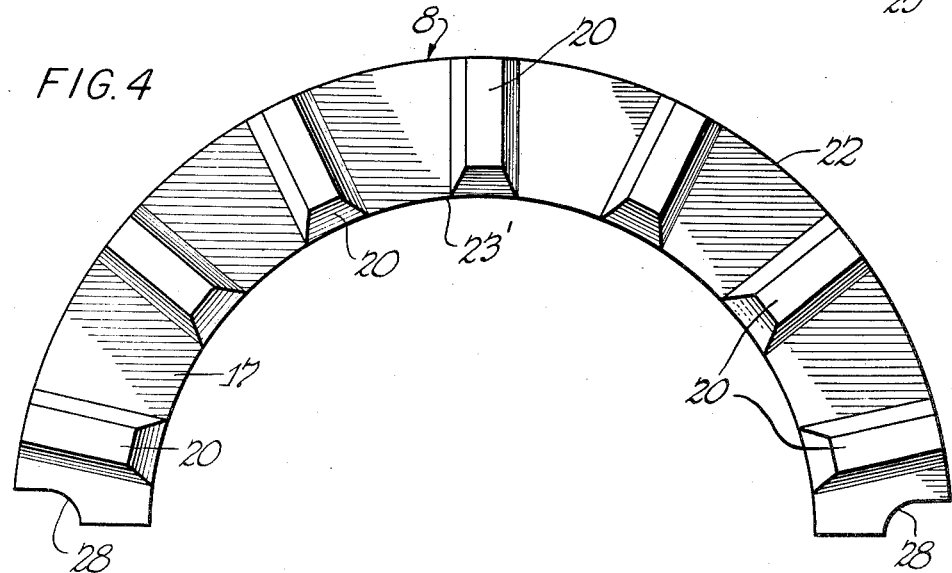
Figure 4 is a bottom plan view of one of the doffer lug components.

The carrier plate 4 serves as a mounting for the clamping elements 7, 7a and the doffer members 8. It will be appreciated from a consideration of Figures 1, 3 and 4 that the members 7, 7a and 8 are respectively, substantially identical and afford a bilaterally symmetrical assembly.

Each securing member 7 is semicircular in plan and comprises an arcuate web portion 9 with a plurality of equally spaced radially elongated perforations 10 which extend from adjacent the inner priphery of the web 9 to adjacent the outer periphery thereof. The inner edge of the web 9 is formed with an inwardly or axially offset seating flange portion 11 which seats as at 12 against the bottom side of the associated carrier plate 4. It will be seen that the contour of the member 7 is concentric with the axis of the plate 4 and that the outer margin of the web 9 is defined by an axially upwardly extending circumferential flange 13 which is adapted to seat on its internal side as at 14 against the outer periphery of the adjacent peripheral portion of the plate 4. The upper margin of the flange 13 is formed integral with an inwardly projecting circumferential radially arranged inturned flange 15 which is adapted to seat against the top side of the plate 4 as at 16.

The doffer elements 8 are each substantially identical and each comprises a generally flat semicircular base portion 17 which is relatively thin in an axial direction as best seen in Figure 2 and is arcuately approximately coextensive with the related member 7 or 7a. The base portion 17 is received between the web 9 and the bottom side of the plate 4 and is stressed under compression therebetween and in flat face engagement therewith as at 18 and 19, respectively. The tendency for the base portion between the plate 4 and the web 9 to expand effects a tight engagement between the interior of the top flange 15 and the top side of the plate 4 along the substantially flat surface 16. The base portion 17 is formed on its bottom side with a plurality of depending doffer lugs 20 of somewhat trapezoidal configuration in cross-section and elongated radially of the axis of curvature of the base portion 17 on the same radius as the doffer carrier plate 4. The lugs 20 are spaced for registry with the respective openings or slots 10 in the web 9 and it will be seen from a consideration of Figure 1 that the outer circumference 22 of the base portion 17 substantially coincides with the inner face 23 of the axial flange 13 of the associated clamping member 7 or 7a, said inner face defining the outer edge of each slot 10 each of which further has generally radial side edges 10a, 10b. The inner marginal edge or circumference 23' of the base portion 17 is of substantially greater radius than that of the inner edges or margins 24 of the openings 10 and the width of each lug 20 is substantially less than the width of the opening 10 to which it extends to provide an area of flexing for each lug when operating in wiping over a spindle and thus prevent concentrating high loads in the immediate zones of juncture of the lugs with the base portion 17.

Each U-shaped member 7, 7a is provided at the outer end portions of its legs with eyes 25 and the eyes 25 of the member 7a are offset axially and adapted to superpose with respect to the eyes 25 of the opposite member 7 and the openings in the eyes are adapted to register with respective openings 26 in the plate 4 for reception of a securing nut and bolt assembly 27 which is accommodated through a cutout 28 in the adjacent end of the base portion 17.

Assuming that a worn doffer is to be replaced in the field and that the doffer disk 4 is mounted on the shaft 2, the mechanic would merely remove the nut and bolt assemblies 27 and then separate the clamping elements 7, 7a from the plate 4 by merely moving the clamping elements radially away from the plate and would also carry the doffer elements which then would be removed from the respective clamps. New doffing elements 8 which, of course, are made of rubber material are then inserted within the respective clamps 7, 7a with the lugs 20 projected through the respective openings 10 and the outer margins 22 of the mounting base portions snugly seated against the inner faces 23 of the flanges 13 within the pockets 29 defined between the flanges 9 and 15 and the flange 14. Then the inner side 19 of each member 8 is placed on the bottom side of the plate 4 and the members 7, 7a together with the doffing elements 8 therein are slid radially together in telescoped position and the eyes 25 of the respective elements 7, 7a are aligned and the bolts 27 inserted through the appropriate openings and tightened.

It will be now readily appreciated that the arrangement herein disclosed provides a facile assembly which affords a positive securement of the doffing components with the plate carrier 4. Furthermore only three different parts are involved, that is the component 8 and the clamps 7, 7a and the arrangement of these parts obtains a self-guiding and aligning feature.

For ease in assembly, the eyes 25 at one of the adjacent ends of the members 7, 7a may be secured to the plate 4 and then the sub-assemblies 7, 8 and 7a, 8 may be swung into telescoped coupled concentric relationship onto the plate 4 and then the other bolt 27 applied.

What is claimed is:

1. A cotton picker doffer, comprising: a generally circular carrier plate, a pair of complemental, semicircular clamping members concentric with said plate and in radially telescoped relationship therewith, each member including a perforated web portion disposed in axially spaced relationship to one side of the plate, an axially directed peripheral flange on the web portion overlapping the periphery of the carrier plate, a radial inturned flange integral with said axially directed flange disposed against the opposite side of the carrier plate; and a pair of complemental doffing elements associated with respective members and each having a base portion interposed between said web portion of the related member and said one side of the carrier plate, and doffing lugs connected with said base portion and extending axially thereof through the perforations in said web portion of the associated member.

2. A cotton picker doffer according to claim 1 and said clamping members disposed end to end and having end portions arranged in overlapping relationship to each other, and common securing means extending through the overlapped end portions and said plate and securing the same in assembly.

3. A cotton picker doffer according to claim 1 and said base portion being semicircular, and said perforations being larger than the lugs projecting therethrough, and said lugs being spaced circumferentially from opposite edges of respective perforations.

4. A cotton picker doffer, comprising: a horizontally rotatable mounting member having a flat top side and underface; a pair of complementary securing elements collectively defining a ring concentrically disposed as respects said member and having axially spaced upper and lower flange portions receiving said member therebetween about its periphery and an axially directed interconnecting flange portion therebetween bearing against the periphery of said member, said upper flange portion having a bottom side seated against said top side of said member, said lower flange portion spaced axially below said underface of said member, and having a plurality of substantially uniformly spaced slots therethrough elongated radially of said lower web, and defined by circumferentially spaced side edges and radially inner and outer edges with the outer edge of each disposed along said axially directed flange portion and the inner edge spaced radially outwardly of the inner periphery of the bottom flange portion; a semicircular doffer component in each element disposed substantially concentric therewith and having a base portion compressed between said underface of said member and said lower flange of the associated element, and a plurality of lugs on the base portion, one for each slot and depending from the base portion through the respective slot in spaced relationship to the side and radially inner edges thereof.

5. The doffer according to claim 4 and said lower flange portion having an inner edge with an upwardly offset seating portion bearing against said underface of said member.

6. A doffer according to claim 5 and said base portion having an inner edge disposed radially outwardly of the inner edges of said slots.

References Cited in the file of this patent

UNITED STATES PATENTS

| Number | Name | Date |
|---|---|---|
| 2,247,682 | Hagen | July 1, 1941 |